United States Patent
Wang et al.

(10) Patent No.: US 12,504,613 B2
(45) Date of Patent: Dec. 23, 2025

(54) APPARATUS AND SYSTEM FOR PARTICLE MANIPULATION

(71) Applicant: FUDAN UNIVERSITY, Shanghai (CN)

(72) Inventors: Qing Wang, Shanghai (CN); Antoine Jean-Pierre Rene Riaud, Shanghai (CN); Jia Zhou, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 17/996,756

(22) PCT Filed: Oct. 18, 2021

(86) PCT No.: PCT/CN2021/124322
§ 371 (c)(1),
(2) Date: Oct. 20, 2022

(87) PCT Pub. No.: WO2023/065063
PCT Pub. Date: Apr. 27, 2023

(65) Prior Publication Data
US 2024/0219702 A1    Jul. 4, 2024

(51) Int. Cl.
  *G02B 21/32*  (2006.01)
  *G10K 15/02*  (2006.01)
(52) U.S. Cl.
  CPC ............. *G02B 21/32* (2013.01); *G10K 15/02* (2013.01)
(58) Field of Classification Search
  None
  See application file for complete search history.

(56) References Cited

U.S. PATENT DOCUMENTS

2020/0338593 A1   10/2020   Baudoin et al.

FOREIGN PATENT DOCUMENTS

| CN | 111398175 | * | 7/2020 |
| WO | 2010123453 A1 | | 10/2010 |
| WO | 2013116311 A1 | | 8/2013 |
| WO | 2015134831 A1 | | 9/2015 |
| WO | 2021146698 A1 | | 7/2021 |

OTHER PUBLICATIONS

International Search Report dated Jul. 12, 2022 for International Patent Application No. PCT/CN2021/124322.

\* cited by examiner

*Primary Examiner* — Jyoti Nagpaul

(57) ABSTRACT

The invention discloses an apparatus and a method for capturing and manipulating particles, relating to the field of acoustic manipulation. In view of the problems in the prior art that can't achieve a contactless, versatile, selective, and universal manipulation method for particles, the present application provides photoacoustic tweezers, which uses a photoacoustic transducer unit and an electroacoustic transducer unit to form a bimodal transducer, generates a weak acoustic wave and strong acoustic wave respectively through signal excitation. The strong acoustic wave behaving as a gain medium, amplifies the acoustic radiation force of the weak acoustic wave. The invention enables contactless and label-free selective capture and manipulation of particles. Further, the amplified acoustic radiation force enhances biocompatibility by requiring lower optical powers than alternative optical methods.

19 Claims, 5 Drawing Sheets

APPARATUS AND SYSTEM FOR PARTICLE MANIPULATION

BACKGROUND

Technical Field

The present invention relates to the field of acoustic manipulation, and more specifically to an apparatus and a system for capturing and manipulating particles.

Related Art

Arthur Ashkin first disclosed in 1986 the capture and manipulation of particles by optical methods that use forces exerted by a strongly focused light beam to capture and move objects ranging in size from tens of nanometers to tens of micrometers, which allows for high spatial resolution and highly selective manipulation of a set of particles, but only submicrometric particles can be manipulated. Indeed, the high-intensity laser heating in the prior art methods tends to cause physiological damage to cells or other biological objects.

In the current research on particle trapping and manipulation techniques, in addition to optical methods, more biocompatible methods such as magnetic methods, electric methods (electrophoresis, dielectrophoresis), hydrodynamic methods and acoustic methods have been developed. The aforementioned methods can be used in a variety of particle manipulation applications, such as particle capture, concentration and sorting. Among them, acoustic tweezers are a label-free manipulation method insensitive to optical, magnetic and electrical properties of the medium.

In the prior art, the developed particle manipulation methods cannot simultaneously meet the requirements of being biocompatible, label-free, media-insensitive, selective, and high-throughput. For example, magnetic tweezers require labeling with magnetic bead-conjugated antibodies, which may become expensive in time and money as each type of cell requires a specific antibody. (Opto)electrophoresis (EP)/dielectrophoresis (DEP) is limited by the dependence on particle polarization rate and requires low conductivity media which tend to be not biocompatible (cells usually die quickly if they are not immersed in a suitable medium).

Acoustic tweezers are emerging technologies that have been widely used in particle manipulation. However selective particle manipulation requires complex programmable acoustic arrays or mobile sources, and even the latest selective acoustic vortex transducers can manipulate only one particle at a time.

A comparison of different non-contact particle manipulation methods is shown in Table 1 below.

TABLE 1

| Technique | Size range | Input power (W/cm$^2$) | Main application | System requirement |
|---|---|---|---|---|
| hydrodynamic tweezers | 100 nm-1 mm | none | trapping, sorting, enrichment | flow control |
| optical tweezers | 100 nm-10 μm | $10^4$-$10^7$ | trapping, separation | high power laser, high-numerical aperture |
| acoustic tweezers | 100 nm-10 mm | $10^{-2}$-10 | sorting, washing, patterning | acoustic source |
| electrokinetic tweezers | 1 nm-1 mm | $10^4$-$10^4$ | focusing, sorting, trapping, separation | insulating liquid |
| magnetic tweezers | 1 μm-10 μm | 0.1-10 tesla | separation | magnet, functionalized magnetic beads |

None of the above methods can simultaneously satisfy versatility, biocompatibility and selectivity properties, especially the selective manipulation of multiple particles without affecting adjacent particles at the same time and manipulation of particles of various sizes. Combined with holographic techniques, photoacoustic generation method (PA) can generate almost arbitrary acoustic fields in space with excellent temporal characteristics such as high frequency and broadband. A variety of options for substrate material and aperture size are also possible. However, the main problem with PA method is that they are inefficient and most of the light is converted into heat rather than acoustic waves, which can lead to cell damage by excessive temperature.

SUMMARY

In response to the inability of the prior art to achieve a contactless, selective and versatile manipulation method for particles, the present invention discloses photoacoustic tweezers, an electrophotoacoustic apparatus which comprises a photoacoustic transducer unit and an electroacoustic transducer unit, generating a weak acoustic wave and a strong acoustic wave respectively through signal excitation. The strong acoustic wave behaving as a gain medium, amplifies the acoustic radiation force of the weak acoustic wave. The amplified acoustic radiation force enables the capabilities of selectivity, versatility for particle trapping and manipulation. The biocompatibility is maintained because less laser power is needed for manipulation due to the acoustic radiation force amplification from the gain medium. The purpose of the present invention is achieved by the following technical solution.

An electrophotoacoustic apparatus comprising an electroacoustic transducer unit and a photoacoustic transducer unit, the photoacoustic transducer unit and electroacoustic transducer unit being acoustically connected to the manipulation medium.

The electroacoustic transducer unit is used to generate a strong acoustic wave, and the photoacoustic transducer unit is used to generate a weak acoustic wave. The strong and weak acoustic waves interfere with each other. The strong acoustic wave acts as a gain medium to amplify the acoustic radiation force of the weak acoustic wave.

Preferably, the electroacoustic transducer unit comprises electrodes and piezoelectric materials. Preferably, the impedance of piezoelectric material is about 50Ω, and its size is just larger than the manipulation area.

Preferably, the electrodes are deposited on the piezoelectric material.

Preferably, the piezoelectric material and the electrodes are optically transparent.

Preferably, the photoacoustic transducer unit comprises a photoacoustic conversion material. Preferably, the photoacoustic conversion material has high light-to-sound conversion efficiency.

Preferably, the photoacoustic conversion material is spectrally selective. The photoacoustic conversion material is transparent to some optical wavelengths so that it is transparent enough to allow the observation of the particles and cells being manipulated.

Preferably, the photoacoustic conversion material is AuNP-PDMS nanocomposite material.

Preferably, the photoacoustic transducer unit and the electroacoustic transducer unit can be acoustically connected through direct contact or through the non-contact connection of the intermediate layer.

The present invention proposes novel photoacoustic tweezers that allow selective and versatile manipulation of particles and particles of various sizes ranging from 1 μm to 1 mm. The tweezers are designed using a universal method that incorporates photoacoustic transducer unit to generate the weak acoustic wave; the electroacoustic transducer unit generates the strong acoustic wave as an effective gain medium to amplify the acoustic radiation force of such weak wave.

A particle manipulation system comprising signal generators, an optical module, a medium and an electrophotoacoustic apparatus;

the signal generators comprise a laser generator and a radiofrequency generator, the laser generator being used to emit a laser beam, the laser beam irradiating the electrophotoacoustic apparatus via the optical module to excite and generate a weak acoustic wave; the radiofrequency generator being connected to the electrophotoacoustic apparatus for generating a strong acoustic wave.

Preferably, the optical module comprises an optical microscope.

Preferably, the electrophotoacoustic apparatus is placed on the stage of the optical microscope.

Preferably, the optical module comprises a computer-controlled spatial light modulator (SLM).

Preferably, the acoustic radiation force of the electrophotoacoustic apparatus can be spatially adjusted by the SLM with a resolution as low as 1 μm over the field of view of the microscope, which allows easy tailoring of weak acoustic wave by optical signals without the need for complicated acoustic arrays design, allowing the formation of various trapping points for selective and simultaneous manipulation.

Preferably, the laser generator is a pulsed laser.

Preferably, the laser generator is a nanosecond pulsed laser.

Preferably, the radiofrequency generator comprises a function generator and a radiofrequency power amplifier, the function generator is connected to the radiofrequency power amplifier. Preferably, the radiofrequency generator can be driven by any mode, such as sinusoidal wave, sawtooth wave, triangle wave, pulse wave.

Preferably, the laser generator and radiofrequency generator are synchronized.

Preferably, the laser generator and radiofrequency generator are synchronized to fire simultaneously or with an adjustable delay between them.

Preferably, the direction of the acoustic radiation force established by the optical module and the electrophotoaocustic apparatus can be changed using the adjustable delay between the signal generators.

The present invention is a design method for gain medium amplified photoacoustic tweezers with strong and weak acoustic waves with frequencies and amplitudes of 1 Hz to 1 GHz, 1 Pa to $10^{10}$ Pa, 1 Hz to 1 GHz, and 1 Pa to $10^8$ Pa, respectively. The tweezers disclosed in the present invention can be used to manipulate particles of various sizes from 1 μm to 1 mm with selectivity, biocompatibility and versatility. The present invention can selectively and simultaneously manipulate multiple particles and particles of different sizes without complicated acoustic arrays or high-intensity lasers.

Compared with the prior art, the novel tweezers of the present invention have the following advantages.

(1) The present invention uses lower-intensity laser irradiation, which can better protect cell viability, avoiding damage to cells due to high temperature. Furthermore, the invention is contactless and label-free, achieving high-biocompatible manipulation of particles.

(2) The present invention can produce a reconfigurable photoacoustic field for manipulation of multiple particles, without complicated acoustic arrays or acoustic source movement.

(3) The present invention can manipulate particles of various sizes with a range of 1 μm to 1 mm. The present invention can simultaneously manipulate multiple particles without affecting neighboring particles, with a potential for particle assembly.

(4) The photoacoustic transducer unit has the characteristic of high light absorption and uniform surface structure, which provides high light-to-sound conversion efficiency.

(5) The piezoelectric material (LiNbO3) and its electrodes (ITO) for the electroacoustic transducer unit are optically transparent. In addition, the photoacoustic composite material for the photoacoustic transducer unit is spectrally selective (transparent to a certain wavelength), so that the operation can be visualized directly or with a microscope.

BRIEF DESCRIPTION OF THE DRAWINGS

The present description will be better understood from the following detailed description and the accompanying drawings. The details of the present invention, regarding its structure and operation, can be best understood by referring to the accompanying drawings, in which like reference numbers and designations refer to like elements.

the symbols shown in the figures indicate.

100, glass slide; 101, piezoelectric ceramic disc; 102, AuNP-PDMS photoacoustic composite; 103, 104, ITO electrodes; 105, PDMS microchannel;

201, nanosecond pulsed laser; 202, mirror; 203, 300 mm focal length cylindrical lens;

204, half-wave plate; 205, beam expander; 206, 150 mm focal length cylindrical lens;

207, spatial light modulator (SLM); 208, 175 mm focal length lens; 209, filter; 210, microscope objective; 211, photoacoustic tweezers.

DETAILED DESCRIPTION OF EMBODIMENTS

The present application is described in detail below with reference to the accompanying drawings and specific embodiments.

Embodiment 1

In present application, the photoacoustic tweezers comprise an electroacoustic transducer unit and a photoacoustic transducer unit. The electroacoustic transducer unit is excited to generate a strong acoustic wave, and the photoacoustic transducer unit is excited to generate a weak acoustic wave. The strong acoustic wave acts as a gain medium to amplify the acoustic radiation force of the weak acoustic wave to achieve particle trapping and manipulation.

Figure 1:
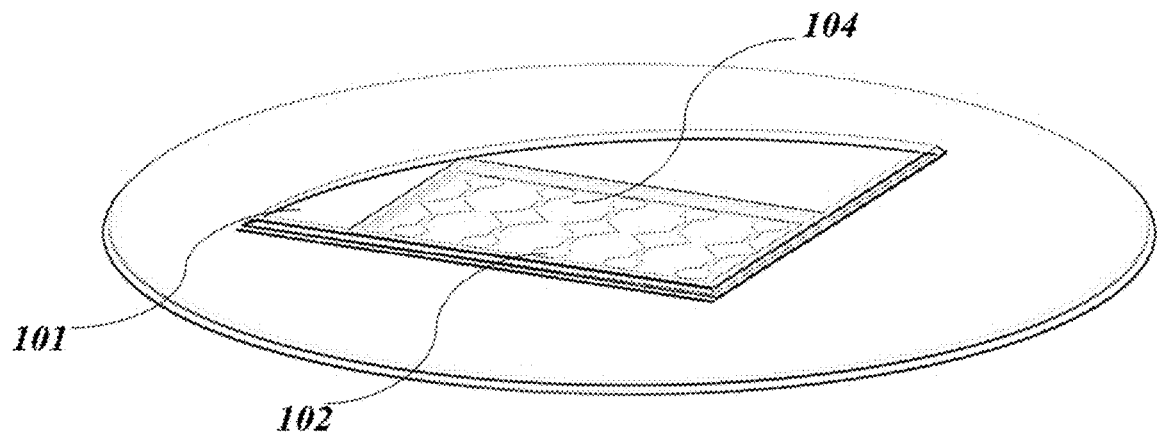
FIG. 1 shows a schematic diagram of embodiment 1 of the photoacoustic tweezers of the present invention.

As shown in FIG. 1, the photoacoustic tweezers comprise LiNbO3 (Y-cut 36°) piezoelectric material 101, ITO electrodes 104 and AuNP-PDMS composite material 102. The ITO electrodes 104 are plated on the upper and lower surfaces of LiNbO3 piezoelectric material 101 as the electroacoustic transducer unit, and the AuNP-PDMS composite 102 is prepared on the electroacoustic transducer unit coated with a thin PDMS intermediate layer by in-situ synthesis method.

The LiNbO3 piezoelectric material 101 coated with electrodes is used as electroacoustic transducer unit to generate the strong acoustic wave, and the AuNP-PDMS composite 102 coated on the electroacoustic transducer unit by the intermediate of a PDMS thin layer is used as photoacoustic transducer unit to generate the weak acoustic wave. The strong acoustic wave behaves as a gain medium to amplify the acoustic radiation force of the weak acoustic wave, so as to achieve high selectivity, high throughput and high versatility for particle trapping and manipulation.

In the photoacoustic tweezers shown in FIG. 1, the electroacoustic transducer unit and the photoacoustic transducer unit are connected by the intermediate of an intermediate of PDMS thin layer, acoustically connected through the manipulation medium. The manipulation medium is an aqueous solution containing the particles to be manipulated, which is injected into the PDMS microchannel attached above the photoacoustic transducer unit. The particles can be solid particles, but also cells, microbes or small tissue samples. In this specific embodiment, the particles are polystyrene microspheres.

Figure 5:
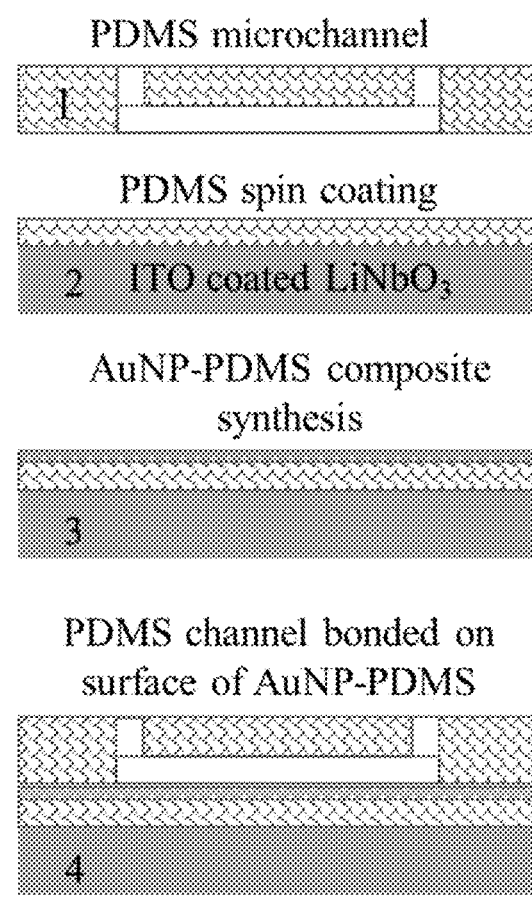
FIG. 5 shows the fabrication process of the photoacoustic tweezers of the present invention.

FIG. 5 shows the manufacturing process of the photoacoustic tweezers of the invention, comprises the following steps:

Step 1: curing PDMS to generate PDMS microchannels;

The PDMS microchannels fabrication is conventional, which will not be described here.

Step 2: plating electrodes on the surface of the piezoelectric material, and spin-coating the thin PDMS layer on the ITO-coated LiNbO3 material;

The transparent indium tin oxide (ITO) electrodes are sputtered on both sides of a lithium niobate (Y-cut 36° LiNbO3) piezoelectric material by physical vapor deposition to form ITO-coated LiNbO3 105 as an electroacoustic transducer unit to generate the strong acoustic wave.

Step 3: Synthesizing the composite material on the surface of the LiNbO3 coated with the thin PDMS layer;

Tetrachloroauric acid (TCA) is dissolved in isopropanol to prepare a stock solution, which is filtered by a 0.22 μm filter. Immersing the electroacoustic transducer unit coated with PDMS into the stock solution of TCA for 48 h, forms AuNP-PDMS composite on the surface of the electroacoustic transducer unit. Finally, the composite is rinsed with water and dried with nitrogen gas.

The AuNP-PDMS composite as a photoacoustic transducer unit is used to convert laser pulses into photoacoustic pulses. After laser irradiation, the AuNP-PDMS composite generates the weak acoustic wave through photoacoustic effect.

Step 4: combining the PDMS microchannel with the composite material in the end to form the photoacoustic tweezers of this embodiment.

The manufacturing operations are described in detail by an example below.

PDMS microchannel is fabricated using SU-8 mold. After pouring PDMS (the weight ratio of base material to curing agent is 10:1) into the mold, degassing for 30 minutes and curing in a 60° C. oven for 2 hours, we peel the cured PDMS from the mold to obtain PDMS microchannel with a depth of 200 μm.

The electroacoustic transducer unit is prepared as follows. Firstly, 180 nm thick ITO is sputtered by physical vapor deposition on both sides of a two-sides-polished 500 μm thick LiNbO3 (Y-cut 36°) piezoelectric material 101. ITO acts on the transparent top and bottom electrodes. Next, the LiNbO3 piezoelectric material is cut to the desired size (45 mm×45 mm) using a laser cutter as the electroacoustic transducer unit to produce the strong acoustic wave.

The above electroacoustic transducer unit is spin-coated with 75 μm thick PDMS (the weight ratio of matrix and curing agent was 10:1) at 1150 rpm for 30 s and cured in an oven at 70° C. overnight. Then the PDMS-coated electroacoustic transducer unit is immersed into 0.015 mol/L TCA isopropanol solution, and the fabrication apparatus is wrapped with sealing film to prevent evaporation, with tin paper to avoid light, and finally to form AuNP-PDMS composite 102 on the PDMS-coated electroacoustic transducer unit after 48 h. The composite is rinsed with water and dried with nitrogen gas to obtain the AuNP-PDMS composite 102 as the photoacoustic transducer unit. The photoacoustic transducer unit is connected with electroacoustic transducer unit through the intermediate of PDMS thin layer to constitute photoacoustic tweezers. The prepared PDMS microchannel is gently pressed above the photoacoustic tweezers, ensuring that there are no bubbles at the contact interface and prevent liquid leakage.

The photoacoustic tweezers in this embodiment, the LiNbO3 piezoelectric material 101 coated with ITO electrodes 104 on both sides is used as an electroacoustic transducer unit to generate the strong acoustic wave, and the AuNP-PDMS composite material 102 is used as a photoacoustic transducer unit to convert laser pulses into photoacoustic pulses to generate the weak acoustic wave. The strong and weak acoustic waves interfere with each other. The strong acoustic wave behaves as a gain medium to amplify the acoustic radiation force of the weak acoustic wave. This allows to trap and manipulate particles in high throughput with high selectivity and versatility.

Embodiment 2

The structure of the present embodiment is substantially the same as embodiment 1. The present embodiment discloses another structure between the electroacoustic transducer unit and the photoacoustic transducer unit in the photoacoustic tweezers.

Figure 2:
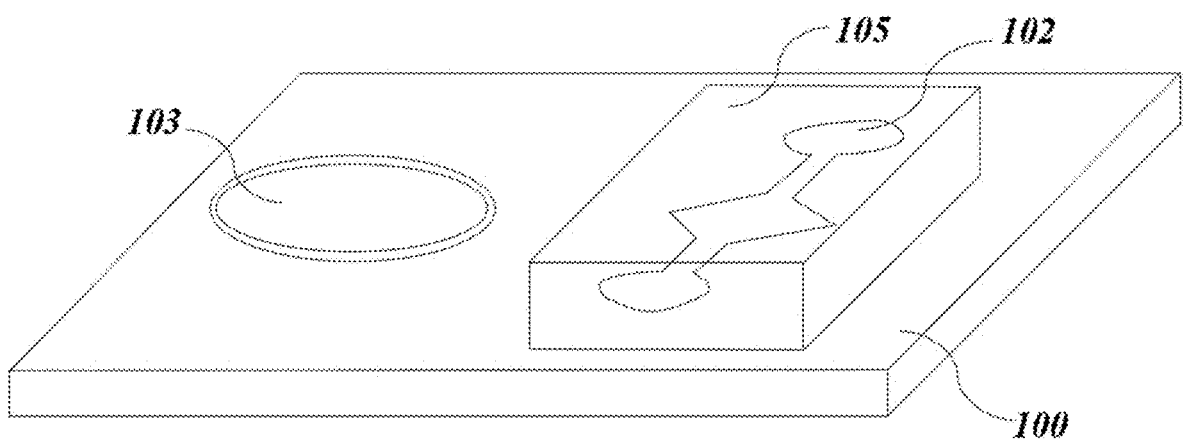
FIG. 2 shows a schematic diagram of embodiment 2 of the photoacoustic tweezers of the present invention

As shown in FIG. 2, in this embodiment, the photoacoustic tweezers comprise a piezoelectric ceramic disc 103, a transparent glass slide 100, AuNP-PDMS composite material 102 and PDMS microchannel 105. The piezoelectric ceramic disc 103 is glued to the transparent glass slide 100, and the AuNP-PDMS composite 102 is prepared in PDMS microchannel 105 by in-situ synthesis. The piezoelectric ceramic disc 103 glued on the glass slide 100 is used as the electroacoustic transducer unit to generate the strong acoustic wave, and the AuNP-PDMS composite 102 is prepared in the PDMS microchannel 105 is used as the photoacoustic transducer unit to generate the weak acoustic wave. The strong acoustic wave acts as a gain medium to amplify the acoustic radiation force of the weak acoustic wave, so as to achieve high selectivity, high throughput and high versatility for particle capture and manipulation.

The electroacoustic transducer unit and the photoacoustic transducer unit with no direct contact are acoustically connected (sandwich-shaped) through an intermediate manipulation medium. The prepared AuNP-PDMS composite 102 in PDMS microchannel 105 is put onto the glass slide 100, and the aqueous solution containing polystyrene particles is injected into the channel.

Embodiment 3

The structure of the present embodiment is substantially the same as embodiment 1. The present embodiment discloses another structure between the electroacoustic transducer unit and the photoacoustic transducer unit in the photoacoustic tweezers.

Figure 3:
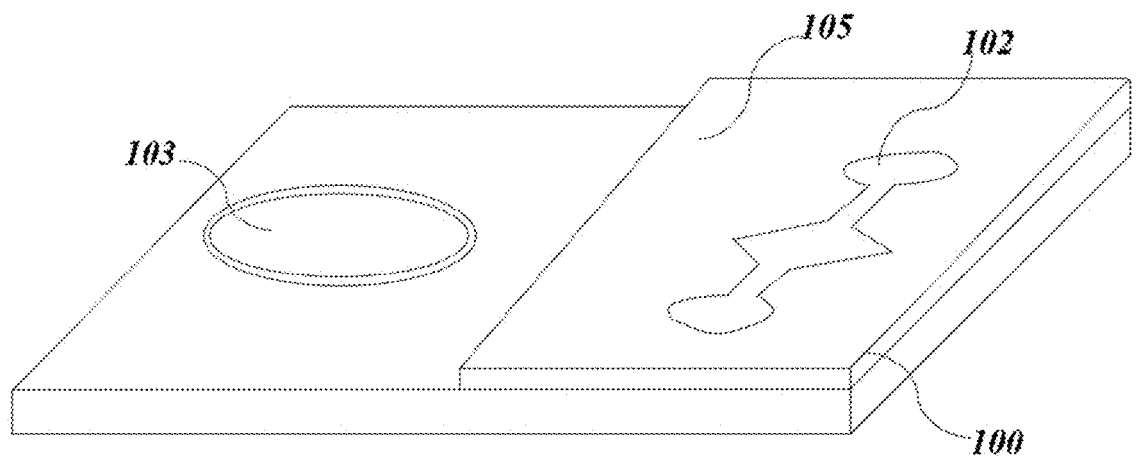
FIG. 3 shows a schematic diagram of embodiment 3 of the photoacoustic tweezers of the present invention

As shown in FIG. 3, in this embodiment, the photoacoustic tweezers comprise LiNbO3 (Y-cut 36°) piezoelectric material 101, ITO electrodes 104, AuNP-PDMS composite material 102 and PDMS microchannel 105. The ITO electrode 104 is plated on the upper and lower surfaces of LiNbO3 piezoelectric material 101, and AuNP-PDMS composite 102 is prepared in PDMS microchannel 105 by in-situ synthesis.

LiNbO3 piezoelectric material 101 coated with electrodes is used as electroacoustic transducer unit to generate the strong acoustic wave, and the AuNP-PDMS composite 102 prepared in the PDMS microchannel 105 is used as the photoacoustic transducer unit to generate weak acoustic wave. The strong acoustic wave acts as a gain medium to amplify the acoustic radiation force of the weak acoustic wave, so as to achieve high selectivity, high throughput and high versatility for particle trapping and manipulation.

The electroacoustic transducer unit and the photoacoustic transducer unit with no direct contact are acoustically connected (sandwich-shaped) through an intermediate manipulation medium. The prepared AuNP-PDMS composite 102 in PDMS microchannel 105 is placed onto the electroacoustic transducer unit, and the aqueous solution containing polystyrene particles is injected into the channel.

Embodiment 4

The structure of the present embodiment is substantially the same as embodiment 2. The present embodiment discloses another structure between the electroacoustic transducer unit and the photoacoustic transducer unit in the photoacoustic tweezers.

Figure 4:
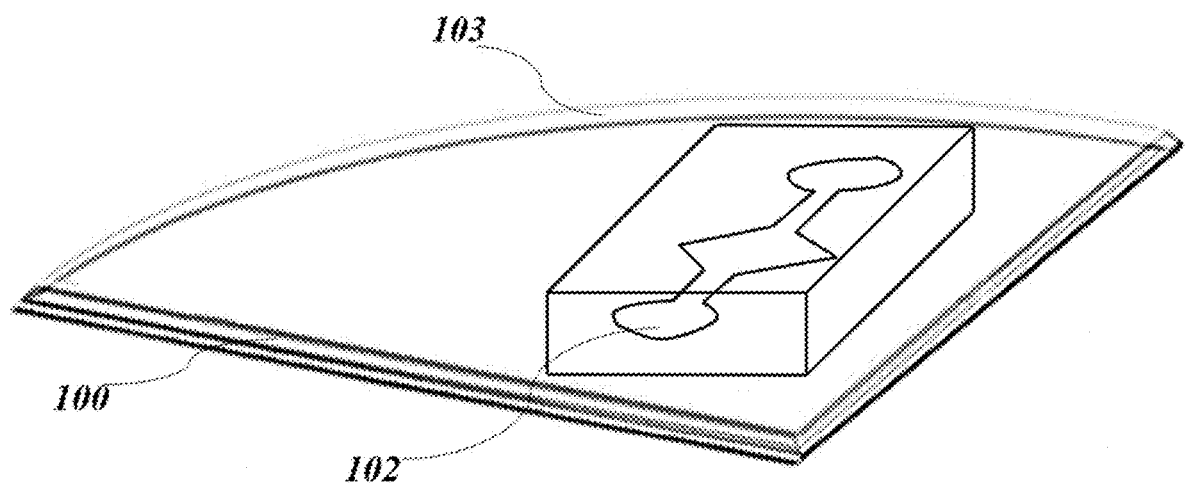
FIG. 4 shows a schematic diagram of embodiment 4 of the photoacoustic tweezers of the present invention.

As shown in FIG. 4, in this embodiment, the photoacoustic tweezers comprise a piezoelectric ceramic disc 103, a transparent glass slide 100 and AuNP-PDMS composite material 102. The piezoelectric ceramic disc 103 is adhered to the transparent slide 100, and the AuNP-PDMS composite 102 is prepared on the slide 100 coated with the intermediate of a PDMS thin layer by in-situ synthesis.

The piezoelectric ceramic disc 103 glued on the glass slide 100 is used as the electroacoustic transducer unit to generate the strong acoustic wave, and the AuNP-PDMS composite 102 wrapped on the electroacoustic transducer unit through the intermediate of PDMS thin layer is used as the photoacoustic transducer unit to generate weak acoustic wave. The strong acoustic wave acts as a gain medium to amplify the acoustic radiation force of the weak acoustic wave, so as to achieve high selectivity, high throughput and high versatility for particle trapping and manipulation.

The electroacoustic transducer unit and the photoacoustic transducer unit are connected together through the intermediate of PDMS thin layer, acoustically connected through the manipulation medium. The manipulation medium is an aqueous solution containing polystyrene particles, which is injected into the PDMS microchannel placed above the photoacoustic transducer unit.

Embodiment 5

According to the photoacoustic tweezers disclosed in embodiments 1 to 4, the present embodiment discloses a particle manipulation system.

The system comprises a laser generator, a radiofrequency generator, an electrophotoacoustic apparatus and an optical module. The laser beam irradiating the electrophotoacoustic apparatus via the optical module to excite and generate a weak acoustic wave; the radiofrequency generator being connected to the electrophotoacoustic apparatus for generating a strong acoustic wave.

Figure 6:
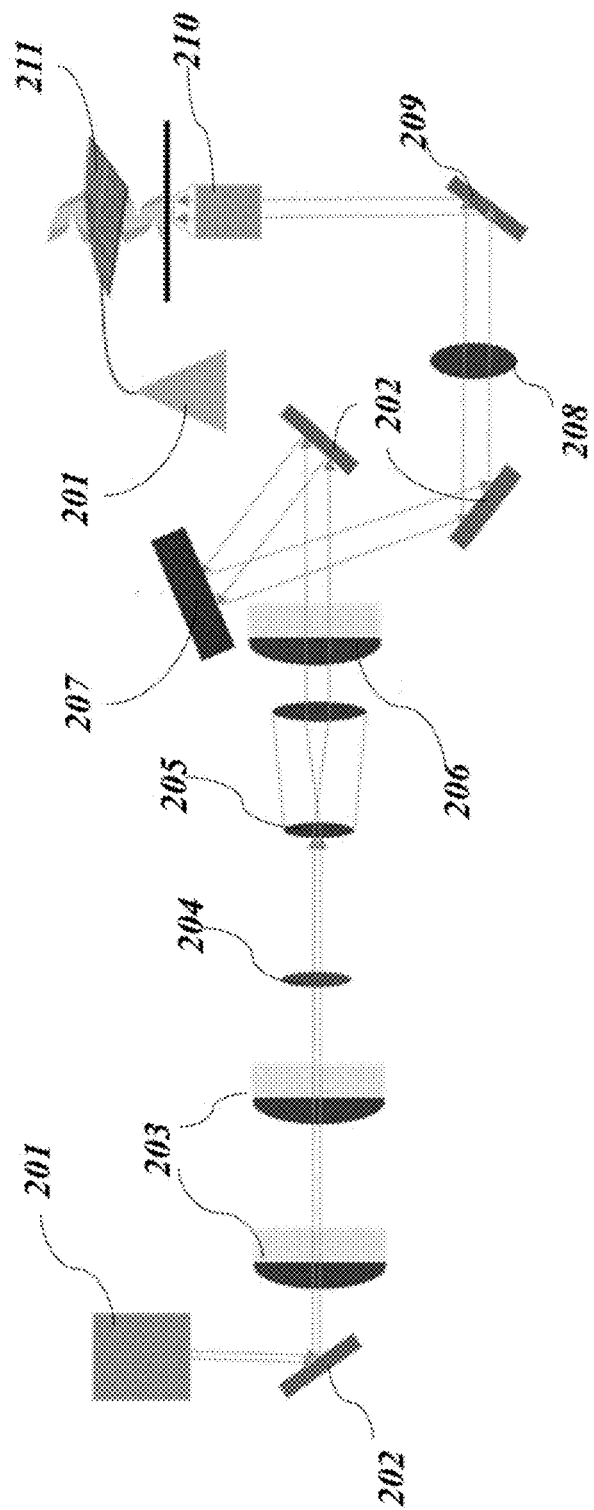
FIG. 6 shows a schematic diagram of the particle manipulation system of the present invention.

As shown in FIG. 6, the laser pulse is generated by the nanosecond pulse laser 201. The generated laser pulse has characteristics of wavelength of 520 nm and a pulse width of 65 ns. The laser beam is reflected by mirror 202, then passes through two 300 mm lens 203, half wave plate 204 and beam expander 205 to be expanded three times. Then the laser beam passes through 150 mm lens 206, mirror 202 and the photosensitive area of liquid crystal spatial light modulator 207 (LC-SLM, thorlabs. Inc) to programmably adjust optical signal. The SLM has an array size of 15.42 mm×9.66 mm, panel resolution 1920×1200 and a pixel spacing of 8 μm. The adjusted beam is reflected by the mirror 202 before passing the 175 mm lens 208 to conjugate it to the focusing plane of the microscope, and then enters into the fluorescence microscope (IX71). After passing through the microscope filter 209 (comprising excitation filter: 531 nm, emission filter: 593 nm, and dichroic mirror), the light enters the objective lens 210 with different magnification (such as 4×, 10×, 20× and 40×) and finally irradiates the photoacoustic tweezers 211. The dichroic mirror reflects the laser beam but is transparent to a wide range of optical wavelength, so that the particles can be observed by fluorescence or bright field imaging.

Figure 7:
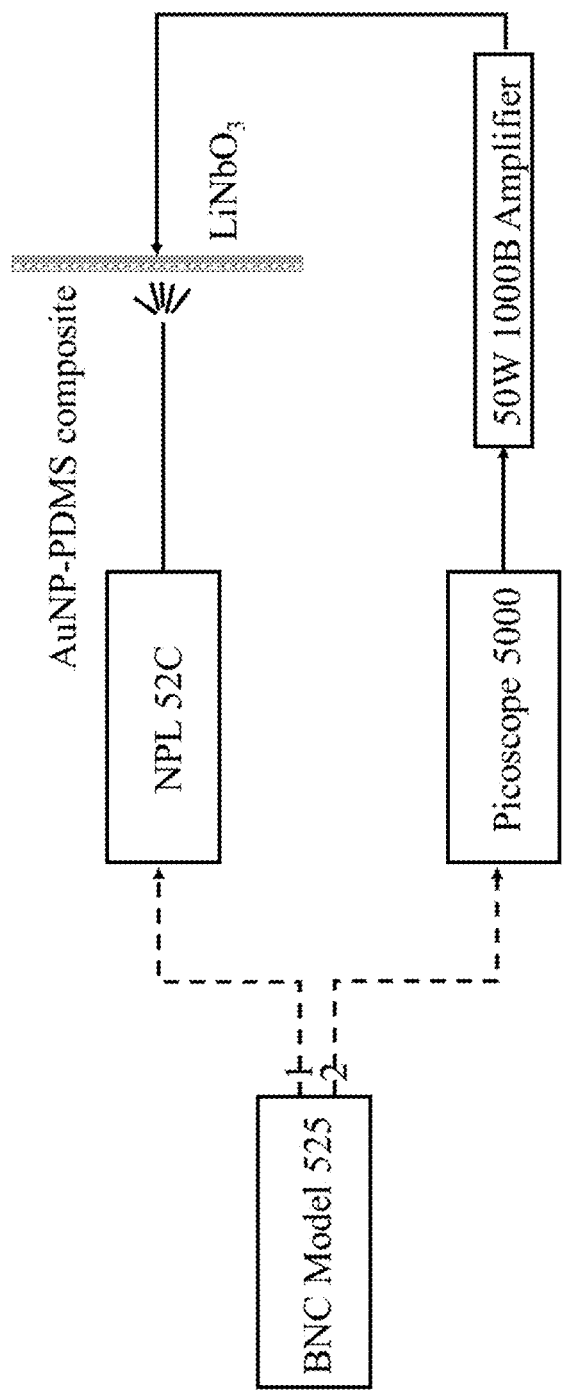
FIG. 7 shows a schematic diagram of the excitation method of the electrophotoacoustic apparatus.

The nanosecond pulsed laser (NPL52C) with an excitation wavelength of 520 nm and a pulse length of 65 ns is triggered by the channel 1 of a digital delay pulse generator (BNC, Model 525). Picoscope 5000 is used as the excitation source of electroacoustic transducer unit. The excitation voltage is 300 mV and the excitation frequency is 7.6 MHz. This electric signal is amplified by a 50 W amplifier (AR worldwide 50W1000B). As shown in FIG. 7, the Picoscope 5000 is triggered by the channel 2 of the digital delay pulse generator. When triggered, the picoscope 5000 fires a burst of five continuous sinusoidal wave periods to generate the strong acoustic wave. The strong acoustic wave and the weak acoustic wave interfere in the microchannel to produce amplified acoustic radiation force for particle manipulation. The digital delay pulse generator allows adjusting the relative phase difference between the weak and strong acoustic waves.

The particles manipulated in this embodiment are fluorescent polystyrene particles (excitation wavelength 532 nm, emission wavelength 610 nm), and the manipulation medium is an aqueous solution added with 0.5% (w/w) Triton X-100 surfactant, 1% (w/w) polyethylene glycol (PEG 400) and 7.8% (w/w) NaCl to avoid particles sticking together, sinking and adhering to the bottom of the substrate. 30 μL particle solution is injected into the PDMS microchannel. After the solution is basically stable and with no obvious fluid flow, the movement of particles is recorded and observed by camera.

In this embodiment, an effective gain medium is built for accurate particle manipulation. The frequency range of strong acoustic wave is 1 Hz to 1 GHz, the amplitude is from 1 Pa to $10^{10}$ Pa. The frequency range of weak acoustic wave is 1 Hz to 1 GHz, and the amplitude range is 1 Pa to $10^8$ pa. The amplitude of the interfered acoustic field is directly proportional to the product of the strong acoustic wave and the weak acoustic wave. Because the strong acoustic wave is spatially uniform, and therefore it can be regarded as a constant gain acting on the weak acoustic wave. That is, the medium irradiated by the strong acoustic wave is the gain medium.

The combination of the photoacoustic transducer unit and the electroacoustic transducer unit forms the electrophotoacoustic apparatus, that is, the described electrophotoacoustic apparatus is photoacoustic tweezers, and the two transducer units with contact or with no contact are acoustically connected through manipulation medium. The photoacoustic transducer unit is driven to generate weak acoustic wave, and the electroacoustic transducer unit is driven to generate strong acoustic wave. The manipulation medium containing suspended particles is introduced into the PDMS microchannel attached to the surface of tweezers to achieve particle trapping and manipulation. The strong acoustic wave is a plane wave with spatial uniformity, and particles cannot move in a plane perpendicular to the propagation axis under the action of the electroacoustic transducer unit alone. Similarly, the acoustic radiation force generated by the photoacoustic transducer unit alone is not sufficient to manipulate particles. Therefore, the photoacoustic tweezers are synchronously excited by the two units. The strong acoustic wave acting on the manipulation medium behaves as a gain medium to amplify the acoustic radiation force of weak acoustic wave. That is, when the two waves interfere with each other, they can achieve selective and versatile manipulation of particles in high-throughput.

The invention can manipulate particles with various sizes in the range of 1 μm to 1 mm. The invention can selectively and simultaneously manipulate multiple particles, and therefore has potential for particle assembly. The invention uses laser pulses to generate the weak acoustic wave, even though photoacoustic conversion is just one of ways to generate the weak acoustic wave, and the invention has no limitation on the generation method of weak acoustic wave.

The above schematically describes the present invention creation and its implementation, the description is not limiting, and the invention can be realized in other specific forms without departing from the spirit or essential features of the present invention. What is shown in the attached drawings is also only one of the embodiments of the present invention creation, the actual structure is not limited to it, and any appended markings in the claims shall not limit the claims involved. Therefore, if a person of ordinary skill in the art is inspired by it and designs a structural method and embodiment similar to the technical solution without inventiveness, without departing from the purpose of the present creation, it shall fall within the scope of protection of the patent. In addition, the word "including" does not exclude other components or steps, and the word "one" before the component does not exclude the inclusion of a "plurality" of such components. The plurality of components stated in the product claims may also be implemented by a single component through software or hardware. The words first, second, etc. are used to denote names and do not indicate any particular order.

The invention claimed is:

1. An electrophotoacoustic apparatus, comprising:
an electroacoustic transducer unit configured to generate a strong acoustic wave; and
a photoacoustic transducer unit configured to generate a weak acoustic wave,
wherein the photoacoustic transducer unit and the electroacoustic transducer unit are acoustically connected through a manipulation medium,
wherein the strong acoustic wave and the weak acoustic wave interfere with each other, and
wherein the strong acoustic wave is a plane wave with spatial uniformity and acts as a gain medium to amplify the acoustic radiation force of the weak acoustic wave.

2. The apparatus according to claim 1, wherein the electroacoustic transducer unit comprises electrodes and a piezoelectric material.

3. The apparatus according to claim 2, wherein the electrodes are deposited on the piezoelectric material.

4. The apparatus according to claim 2, wherein the piezoelectric material and the electrodes are optically transparent.

5. The apparatus according to claim 1, wherein the photoacoustic transducer unit comprises a photoacoustic conversion material.

6. The apparatus according to claim 5, wherein the photoacoustic conversion material is spectrally selective, being transparent to some optical wavelengths.

7. The apparatus according to claim 6, wherein the photoacoustic conversion material is a AuNP-PDMS nanocomposite material.

8. The apparatus according to claim 1, wherein the photoacoustic transducer unit and the electroacoustic transducer unit are acoustically connected directly or through several layers of material, including the manipulation medium.

9. A particle manipulation system, comprising:
a signal generator;
an optical module;
a medium; and
an electrophotoacoustic apparatus,
wherein the signal generator comprises a laser generator and a radiofrequency generator, the laser generator configured to emit a laser beam, the laser beam irradiating the electrophotoacoustic apparatus via the optical module to generate a weak acoustic wave, the radiofrequency generator being connected to the electrophotoacoustic apparatus for generating a strong acoustic wave,
wherein the strong acoustic wave and the weak acoustic wave interfere with each other, and
wherein the strong acoustic wave is a plane wave with spatial uniformity and acts as a gain medium to amplify the acoustic radiation force of the weak acoustic wave.

10. The system according to claim 9, wherein the optical module comprises an optical microscope.

11. The system according to claim 10, wherein the electrophotoacoustic apparatus is placed on the stage of the optical microscope.

12. The system according to claim 9, wherein the optical module comprises a spatial light modulator (SLM).

13. The system according to claim 12, wherein the programmable acoustic field generated by the electrophotoacoustic apparatus is spatially adjusted by the SLM with a resolution as low as 1 μm over the field of view of a microscope.

14. The system according to claim 9, wherein the laser generator is a pulsed laser.

15. The system according to claim 14, wherein the laser generator is a nanosecond pulsed laser.

16. The system according to claim 9, wherein the radiofrequency generator comprises a function generator and a radiofrequency power amplifier, and the function generator is connected to the radiofrequency power amplifier.

17. The system according to claim 9, wherein the laser generator and the radiofrequency generator are synchronously driven.

18. The system according to claim 17, wherein the synchronous excitations of the laser generator and the radiofrequency generator are simultaneous or have an adjustable delay.

19. The system according to claim 18 wherein the direction of the acoustic radiation force established by the optical module and the electrophotoaocustic apparatus is changed using the adjustable delay between signal generators.

* * * * *